United States Patent [19]

Mielke

[11] Patent Number: 4,880,330

[45] Date of Patent: Nov. 14, 1989

[54] PISTON PIN

[75] Inventor: Siegfried Mielke, Neckarsulm, Fed. Rep. of Germany

[73] Assignee: Kolbenschmidt Aktiengesellschaft, Neckarsulm, Fed. Rep. of Germany

[21] Appl. No.: 114,274

[22] Filed: Oct. 27, 1987

[30] Foreign Application Priority Data

Oct. 30, 1986 [DE] Fed. Rep. of Germany ....... 3636913

[51] Int. Cl.$^4$ .............................................. F16C 11/06
[52] U.S. Cl. .................................... 403/152; 403/150; 403/163; 92/187
[58] Field of Search ............... 403/150, 151, 152, 163; 92/187, 216

[56] References Cited

U.S. PATENT DOCUMENTS

| 1,618,600 | 2/1927 | Matthews | 403/152 X |
| 2,276,040 | 3/1942 | Hull | 52/729 X |
| 2,848,077 | 8/1958 | Tofanelli | 52/729 X |
| 3,479,929 | 11/1969 | Fangman | 92/187 |
| 3,702,092 | 11/1972 | Zollner | 92/187 |
| 4,544,299 | 10/1985 | Danckert | 92/187 X |

Primary Examiner—Andrew V. Kundrat
Attorney, Agent, or Firm—Sprung Horn Kramer & Woods

[57] ABSTRACT

A piston rod for pistons of reciprocating piston machines is I-shaped in cross-section. In order to effect a reduction in weight that flange of the piston rod which is nearer to the connecting rod and is embraced as by claws by the forked and hook-shaped end portion of the connecting rod has a smaller width than the flange which is nearer to the piston head.

17 Claims, 2 Drawing Sheets

4,880,330

PISTON PIN

BACKGROUND OF THE INVENTION

This invention relates to a piston pin for pistons of reciprocating piston machine, particularly of internal combustion machines, which pin is I-shaped in cross-section and has flanges which are connected by a web and support the piston at the piston pin bosses and have outside surfaces which have the contour of an arc of a circle having an equal radius.

An important part of the development work, particularly for internal combustion engines, is concerned with the compact piston, which should be as light in weight as possible and should be able to transmit present-day high motor powers of, e.g., 65 H.P./1, without a sacrifice regarding oil consumption and blow-by and also in consideration of the increased requirements regarding smooth mechanical running, particularly in a cold state. Because the piston pins account for a substantial part of the oscillating masses of the power unit, lightweight alternatives consisting of steel, plastic, composite and ceramic piston pins reinforced by carbon fibers have been developed in the art and permit a saving in weight up to 25% or even 40% compared to a conventional piston pin of steel. The piston pins have an endurance limit which is sufficient for an igniting pressure PZ=60 bars. But their manufacture is much more expensive than the manufacture of the conventional piston pins of steel and for this reason they can be used at present only for special applications. Pending U.S. application 039,813 filed Apr. 14, 1987, and now U.S. Pat. No. 4,709,620 discloses a piston pin which is I-shaped in cross-section and its flanges have outside surfaces having a contour of an arc of a circle. That piston pin can be used with connecting rods of all kinds and is lighter by about 20% than a piston pin of steel whereas the expenditure is not appreciably increased.

SUMMARY OF THE INVENTION

It is an object of the present invention to further reduce the weight of the piston pins described hereinbefore whereas the endurance limit should not be adversely affected.

In a piston wherein only the piston pin bosses contact the flanges of the piston pin, which is I-shaped in cross-section, that object is accomplished in that the width of the flange which is nearer to the connecting rod is smaller by 5 to 35% than the width of the flange that is nearer to the piston head and/or the height of the former flange in the plane in which a load is applied is 5 to 40% smaller than the height of the latter flange.

In a piston wherein the piston pin bosses and at least partly the head contact the flanges of the piston pin, which is I-shaped in cross-section, the object of the invention is accomplished in that the width of the flange that is nearer to the piston head is smaller by 5 to 35% than the width of the flange which is nearer to the connecting rod and/or the height of the former flange in the plane in which a load is applied is smaller by 5 to 40% than by height of the latter flange.

In the plane in which a load is applied the height of the flange which is nearer to the connecting rod is smaller by 5 to 40% than the height of the flange which is nearer to the piston head. For this reason the I-shaped piston pin can be made in a form which is appropriate for the material if the selected material consists of a ceramic, such as $Si_3H_4$. The piston pin made of ceramics differs from a piston pin of steel in that it will withstand compressive stresses which are three times higher than the permissible tensile stresses so that the flange that is nearer to the connecting rod may be smaller in cross-section and the piston pin will have an optimum weight.

In some cases both the width and the height of the flange can be decreased.

In a development of the invention, the outside surface of the flange which has a smaller width merges toward both sides with broken or rounded edges into surfaces which are parallel to the plane in which a load is applied.

In view of the object set forth, the I-shaped piston pin is preferably made by extrusion because in that case the inclusions in the steel, which are critical regarding the endurances limit of the piston pin, will be given an elongate shape in the direction in which the stress is applied so that they will hardly affect the strength of the piston pin.

In a preferred embodiment of the piston pin, the flange which is nearer to the connecting rod is positively embraced as by claws by the hook-shaped forked end of the connecting rod and the inside surfaces of the hook-shaped forked end of the connecting rod are rounded with a radius in excess of 2 and up to 20 mm in the transitional portions between the forked and hook-shaped portions. Owing to the comparatively smaller width of the flange the lever arm is correspondingly shorter so that the bending stresses in the transitional portions between the forked and hook-shaped portions at the forked and hook-shaped end of the connecting rod will be reduced and an overstressing of the connecting rod will be avoided.

In accordance with a special feature of the invention the rounded inside surfaces are cold-hardened or hardened, e.g., by roll-forming or shot peening. The resulting assembly consisting of the piston, piston pin and connecting rod can be operated without difficulty even at very high speeds, e.g., in excess of 6,500 r.p.m.

Assemblies consisting of a piston, piston pin and connecting rod are shown by way of example on the drawings.

DETAILED DESCRIPTION OF THE INVENTION

Figure 1:
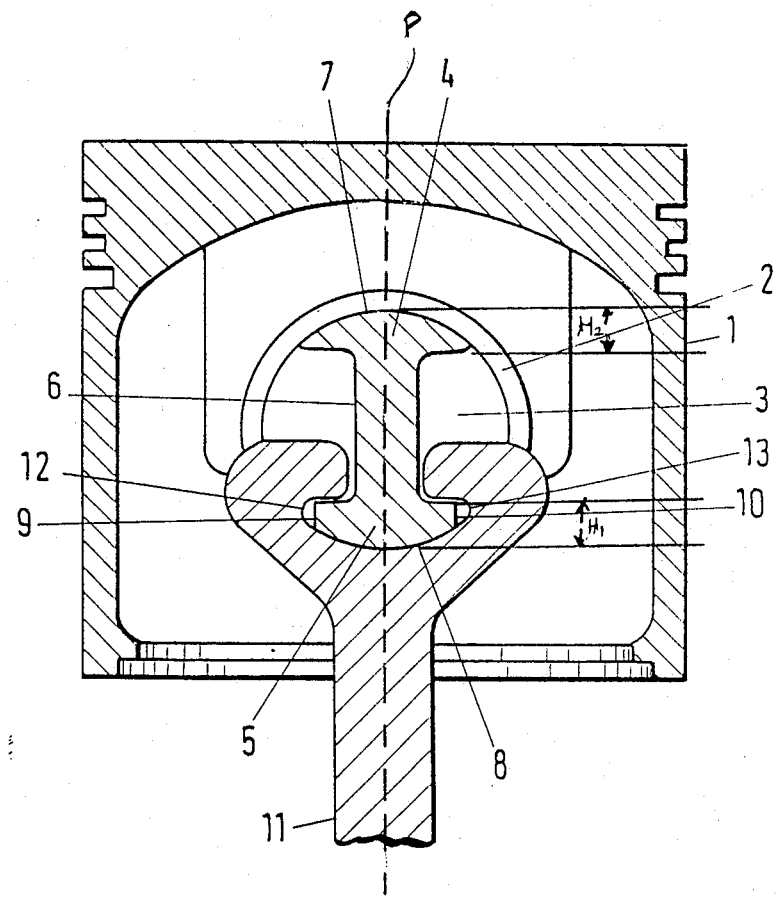
FIG. 1 is a longitudinal sectional view taken on the plane which contains the piston axis and the axis which is at right angles to the piston axis.

Referring now to FIG. 1, at the bosses 2, defining the piston pin 6, which is I-shaped in cross-section, the outside surfaces 7,8 of the flanges 4, 5 have a contour in the shape of an arc of a circle having an equal radius. The width of the flange 5 which is nearer to the connecting rod 11 is smaller by about 20% than the width of the flange 4 which is nearer to the piston head. The outside surface 8 of the former flange merges toward both sides into surfaces 9, 10 which are parallel to the plane P (which is perpendicular to the plane of the paper) in which a load is applied. That flange 5 which is nearer to the connecting rod is positively embraced as by claws by forked and hook-shaped end portion of the connecting rod 11 and the inside surfaces of said end portion are rounded with a radius of 5 mm in the transitional portions 12, 13 between the forked and the hook-shaped portions. The hook-shaped portions have a relatively short lever arm. The height $H_1$, of the flange 5 in the plane P is 5 to 40% smaller than the height $H_2$ of the flange 4.

Figure 2:
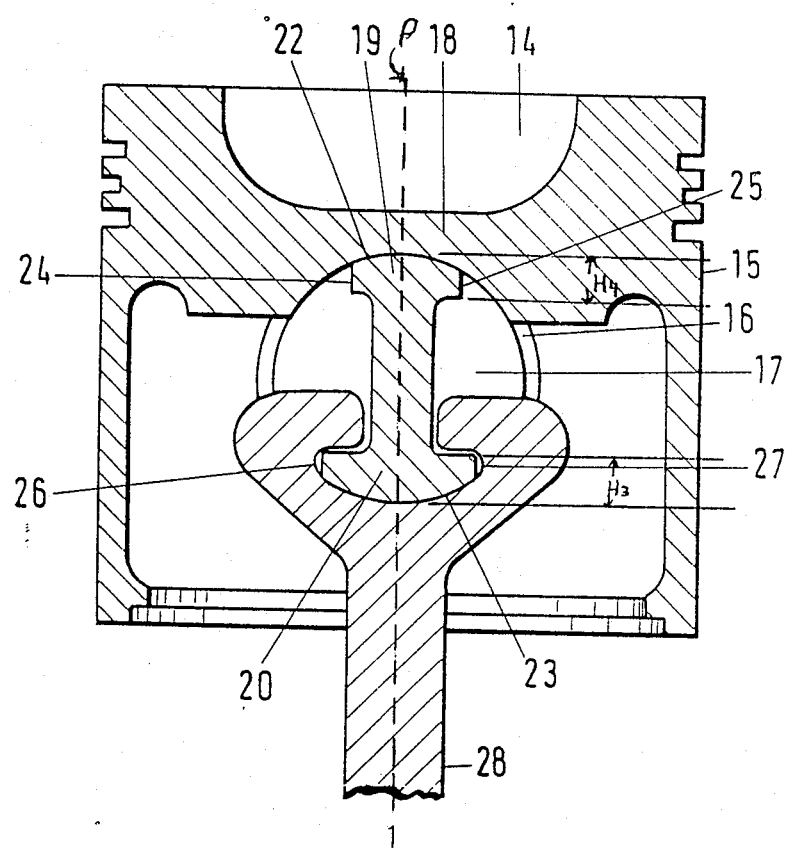
FIG. 2 is a longitudinal sectional view taken on a plane which contains the axis that is at right angles to the pin and the piston axis and shows an assembly that consists of a piston, a piston pin and a connecting rod.

In FIG. 2, the piston 15 is provided with a combustion chamber recess 14 and at the bosses 16 defining the piston pin bores 17 and at the piston head 18 lies on the flanges 19, 20 of the piston pin 21, which is I-shaped in cross-section. The outside surfaces 22, 23 of the flanges 19, 20 have the shape of an arc of a circle and have the same radius. The width of the flange 19 which is nearer to the piston head is smaller by about 25% than the width of the flange 20 which is nearer to the connecting rod. The outside surface 22 of the former flange merges toward both sides into surfaces 24, 25 which is parallel to the plane P (which is perpendicular to the plane of the paper) in which a load is applied. Those inside surfaces of the transitional portions 26, 27 between the forked and hook-shaped portions of the forked and hook-shaped end portion of the connecting rod 28 have inside surfaces which face the longitudinal side faces of the flange 20 which is nearer to the connecting rod and said inside surfaces are rounded with a radius of 2.8 mm. The height $H_4$ of flange 19 in the plane P is 5 to 40% smaller than the height $H_3$ of flange 20.

What is claimed is:

1. In a piston pin for pistons of reciprocating piston machines, in particular internal combustion machines, wherein the pin is I-shaped in cross-section and has flanges which are connected by a web and support the piston at piston pin bosses and have outside surfaces which have the contour of an arc of a circle having the same radius, the improvement wherein the width of one flange which is nearer to a connecting rod is smaller by 5 to 35% than the width of the other flange that is nearer to the piston head and wherein the outside surface of the flange having a smaller width merges toward both sides with edges into surfaces which are parallel to the plane in which a load is applied.

2. A piston pin according to claim 1, wherein the I-shaped piston pin is formed by extruding.

3. A piston pin according to claim 1, wherein the flange which is nearer to the connecting rod is positively embraced as by claws by a hook-shaped forked end of the connecting rod and inside surfaces of the hook-shaped forked end of the connecting rod are rounded with a radius in excess of 2 and up to 20 mm in transition portions between the forked and hook-shaped portions.

4. A piston pin according to claim 3, wherein the rounded inside surfaces are cold-hardened or hardened.

5. In a piston pin for pistons of reciprocating piston machines, in particular internal combustion machines, wherein the pin is I-shaped in cross-section and has flanges which are connected to a web and support the piston at piston pin bosses and at a piston head and have outside surfaces which have the contour of an arc of a circle having the same radius, the improvement wherein the width of one flange that is nearer to the piston head is smaller by 5 to 35% than the width of the other flange which is nearer to a connecting rod.

6. A piston pin according to claim 5, wherein the outside surface of the flange having a smaller width merges toward both sides with edges into surfaces which are parallel to the plane in which a load is applied.

7. A piston pin according to claim 6, wherein the I-shaped piston pin is formed by extruding.

8. A piston pin according to claim 6, wherein the flange which is nearer to the connecting rod is positively embraced as by claws by a hook-shaped forked end of the connecting rod and inside surfaces of the hook-shaped forked end of the connecting rod are rounded with a radius in excess of 2 and up to 20 mm in transitional portions between the forked and hook-shaped portions.

9. A piston pin according to claim 8, wherein the rounded inside surfaces are cold-hardened or hardened.

10. In a piston pin for pistons of reciprocating piston machines, in particular internal combustion machines, wherein the pin is I-shaped in cross-section and has flanges which are connected by a web and support the piston at piston pin bosses and have outside surfaces which have the contour of an arc of a circle having the same radius, the improvement wherein the height of one flange in the plane in which a load is applied is 5 to 40% smaller than the height of the other flange wherein the outside surface of the one flange merges toward both sides with edges into surfaces which are parallel to the plane in which a load is applied.

11. A piston pin according to claim 10, wherein the I-shaped piston pin is formed by extruding.

12. A piston pin according to claim 10, wherein the one flange is positively embraced as by claws by a hook-shaped forked end of a connecting rod and inside surfaces of the hook-shaped forked end of the connecting rod are rounded with a radius in excess of 2 and up to 20 mm in transition portions between the forked and hook-shaped portions.

13. A piston pin according to claim 12, wherein the rounded inside surfaces are cold-hardened or hardened.

14. In a piston pin for pistons of reciprocating piston machines, in particular internal combustion machines, wherein the pin is I-shaped in cross-section and has flanges which are connected to a web and support the piston at piston pin bosses and at a piston head and have outside surfaces which have the contour of an arc of a circle having the same radius, the improvement wherein the height of the one flange in the plane in which a load is applied is smaller by 5 to 40% than the height of the other flange, and wherein the outside surface of the one flange merges toward both sides with edges into surfaces which are parallel to the plane in which a load is applied.

15. A piston pin according to claim 14, wherein the I-shaped piston pin is formed by extruding.

16. A piston pin acording to claim 14, wherein the one flange is positively embraced as by claws by a hook-shaped forked end of a connecting rod and inside surfaces of the hook-shaped forked end of the connecting rod are rounded with a radius in excess of 2 and up to 20 mm in transitional portions between the forked and hook-shaped portions.

17. A piston pin according to claim 16, wherein the rounded inside surfaces are cold-hardened or hardened.

* * * * *